Figure 1:
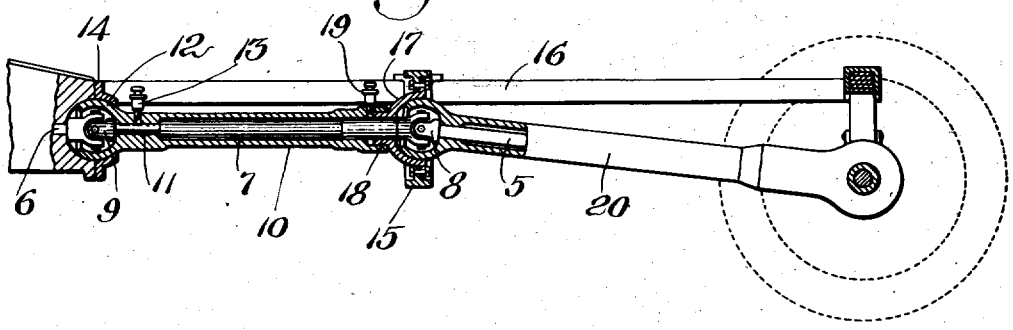

G. S. DAVISON.

MOTOR VEHICLE EXTENSION DRIVE SHAFT.

APPLICATION FILED MAY 4, 1916.

Reissued July 12, 1921. 15,149.

Inventor:

Guy S. Davison, by Geo. S. Maxwell

Attorney.

UNITED STATES PATENT OFFICE.

GUY S. DAVISON, OF HOLDERNESS, NEW HAMPSHIRE, ASSIGNOR, BY MESNE ASSIGNMENTS, TO THE LONGFORD COMPANY OF AMERICA, OF CAMBRIDGE, MASSACHUSETTS, A CORPORATION OF MAINE.

MOTOR-VEHICLE EXTENSION DRIVE-SHAFT.

15,149. Specification of Reissued Letters Patent. Reissued July 12, 1921.

Original No. 1,163,643, dated December 14, 1915, Serial No. 21,299, filed April 14, 1915. Application for reissue filed May 4, 1916. Serial No. 95,477.

*To all whom it may concern:*

Be it known that I, GUY S. DAVISON, citizen of the United States, residing at Holderness, in the county of Grafton and State of New Hampshire, have invented certain new and useful Improvements in Motor-Vehicle Extension Drive-Shafts, of which the following is a specification.

This invention relates to the drive shaft of automobiles and other motor vehicles, and one object is to provide an extension shaft by means of which the wheel base of the car may be lengthened, thus enabling a short car to be changed to a truck or other large commercial car.

The invention also has for its object to provide a structure which enables the change to be readily made, and without altering the structure of the car driving mechanism.

In carrying out my invention I provide mechanism which will maintain the rear or main drive shaft, the rear or driving axle, and the differential gears transmitting motion from the drive shaft to the axle in exactly the same relative position as said parts are originally built and intended to be used. This feature is of special importance as the driving strain on differential or other transmission gears is exactly calculated for the original structure, and by maintaining this original relative position, angularly and actually with regard both to the engine and the driving axle, it is feasible to secure a longer wheel base and hence greater carrying capacity for an automobile without undue and unexpected strain on the structure of the car driving mechanism. I have discovered that, by lengthening the wheel base of an automobile, greater carrying capacity will be secured which will properly distribute the load on both rear and front wheels, and that by means of a short lengthening shaft extending in alinement with the motor shaft, and connecting with the driving shaft for the rear axle in a way and manner to maintain said driving shaft in exactly the original relative angular position with the rear axle, differential gears therein and the like, that such a lengthening of a motor car wheel base may be accomplished which will preserve all the original elements of design, strength, and structure of the car driving mechanism without imposing upon the same any undue strains, torsions or binding actions and therefore will insure the smooth and even running of the lengthened car driving mechanism as effectively as in the original unlengthened chassis. In carrying out my invention, I, therefore, follow the principle above outlined and to this end I provide an extension shaft adapted to fit upon and carry out the alinement of the driving shaft from the motor or transmission gear therefrom, of a length equal to the increased length of wheel base desired, extending the side bars or frame of the chassis and applying a cross bracket or like supporting member where the short motor shaft extension and the driving shaft to the rear axle are connected. This enables me to simply disconnect the driving shaft of a car from the motor shaft, move the rear axle, differential and said driving shaft rearwardly to the desired position for increased length desired and interpose a short extension shaft uniting said driving shaft with the motor shaft and with said extension being substantially in alinement with the motor shaft. The latter feature is most important in practice, and, as above noted, enables a lengthened wheel base of a car to be easily, quickly, economically and readily constructed without altering the structure of the car driving mechanism. It is usual in motor cars, as now constructed, to have the motor shaft and the transmission gearing adjacent thereto substantially horizontal with the side frames, whereas the drive shaft connected with the rear axle and the differential therein is at an angle, extending downwardly at an angle from the side frames to the rear axle. My invention enables exactly this angle to be maintained in the car with the lengthened wheel base and with the extension member in alinement with the motor shaft and substantially horizontal. With the addition of a single cross bracket or bearing for the junction of the short extension shaft and the rear angularly positioned drive shaft, a considerable increase in length of wheel base can be secured.

The objects stated are attained by means of a novel combination and arrangement of parts to be hereinafter described and claimed and in order that the invention may be better understood, reference is had to the accompanying drawing in which—

Figure 2:
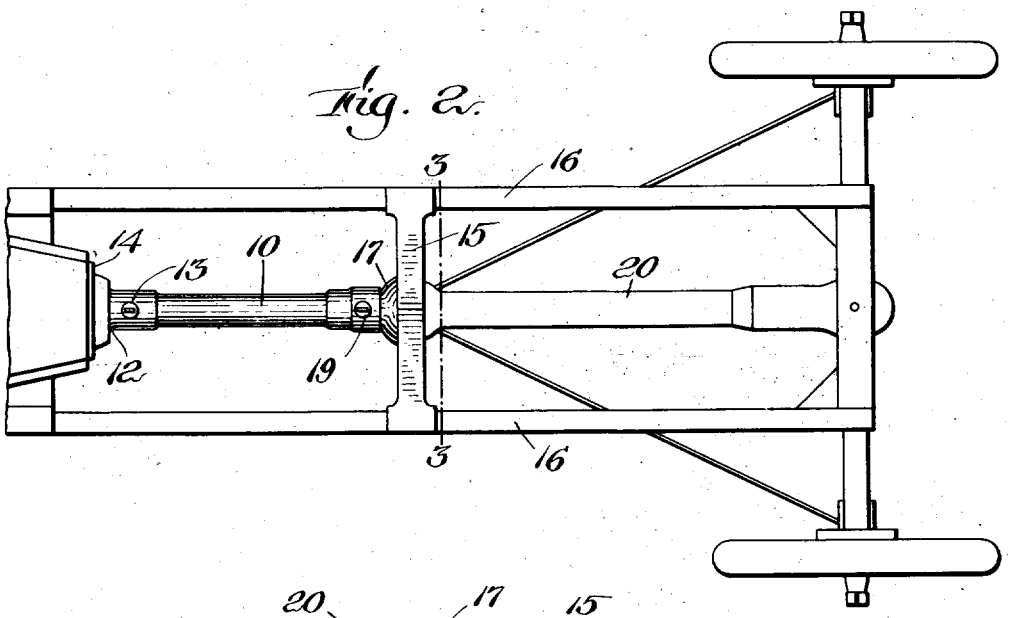
Figure 3:
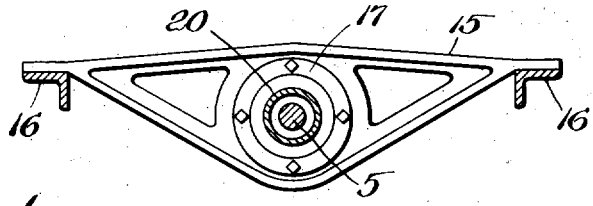

Figure 1 is a side elevation of the invention, partly in section; Fig. 2 is a plan view; and Fig. 3 is a cross-section on the line 3—3 of Fig. 2.

Referring specifically to the drawing, 5 denotes the transmission shaft of the car, the same being operatively connected at its rear end, through the usual differential driving gear, to the rear axle of the car. Ordinarily, the shaft 5 is directly connected to the motor drive shaft 6 of the change-speed transmission gearing, but as it is the object of the invention to lengthen the wheel base of the machine, there has been interposed between the shafts 5 and 6 an extension shaft 7, the length of the latter corresponding to the desired increase in the length of the wheel base. The rear end of this extension shaft is connected by a universal joint 8 to the transmission shaft 5, and at its forward end may also be connected by a universal joint 9 to the shaft 6, or in any other suitable manner. The rotation of the shaft 6 is therefore transmitted to the shaft 5 through the extension shaft 7 and substantially in the same relative alinement and arrangement as originally designed.

The extension shaft 7 is housed in a tube 10 having at its forward end a bearing 11 which supports the corresponding end of said shaft. This end of the tube also has a globular enlargement 12 in which is housed the universal joint 9. The bearing 11 is provided with a grease cup 13. A washer 14 encircling the housing 12 secures the forward end of the tube to the transmission case, the washer being bolted to said case.

The rear end of the tube 10 is supported by a hanger 15 extending transversely between the side bars 16 of the car frame and bolted or otherwise secured thereto. The hanger has, midway between its ends, an opening in which seats and is secured a coupling member 17 which is dished to fit in the opening and has on one side a tubular extension 18 extending into the rear end of the tube 10 and serving as a support for the tube and a bearing for the rear end of the shaft 7. This bearing is also provided with a grease cup 19. The member 17 is bolted or otherwise rigidly fastened to the hanger, the wall of the opening in the latter being beveled so that said member may fit snugly therein. The usual tubular housing 20 of the shaft 5 is retained at its forward end to the member 17, said end of the housing, in conjunction with the member 17, forming a housing which incloses the universal joint 8.

The extension shaft 7 can be readily applied to the car after disconnecting the shafts 5 and 6, and moving the former, with the rear axle, rearward according to the length of the extension shaft. The drawing shows the invention applied to a "Ford" car, but it is applicable with equal facility to other makes of cars.

The advantages of thus lengthening the wheel base, and driving shaft of an automobile while maintaining the entire structure of the car driving mechanism substantially in its original designed construction, alinement and arrangement, will be appreciated, especially when it is realized that the transmission gears, bearings, and the like, are all originally constructed for coöperation. Furthermore, my invention enables all the original parts of the car driving mechanism to be retained and utilized, the only essential elements being the short extension drive shaft and the intermediate bracket or hanger 15 to support and maintain the driving shaft 5 in the same angular position in the new location to which the car is lengthened.

My invention is further described and defined in the form of claims as follows:

1. The combination, with the transmission and drive shafts of a motor vehicle, of mechanism adapted to lengthen the wheel base of said vehicle, comprising means to extend the rear wheels, supporting axle, and transmission shaft operatively connected therewith, from the motor drive shaft rearwardly, means carried by the side frames to support and maintain the transmission shaft at substantially the same angle with the rear axle, in said moved position, as in its former position, and means to connect the motor drive shaft with said transmission shaft in its new position.

2. The combination, with the transmission and drive shafts of a motor vehicle, of mechanism adapted to change the wheel base from a small car to a large truck, comprising means to space the rear wheels, axle and transmission shaft operatively connected therewith, from their original position adjacent the motor drive shaft, a cross bracket to support the transmission shaft in substantially the same angle with the rear axle as in its original position, a bearing in said bracket for the transmission shaft and an extension shaft from the motor to said cross bracket, operatively connecting the transmission shaft with said motor drive shaft.

3. The combination, with the transmission and drive shafts of a motor-vehicle, of mechanism adapted to change the wheel base of a small car to a large truck, comprising means to space the rear wheels, axle and transmission shaft operatively connected therewith, from their original position, including a cross bracket to support the transmission shaft in substantially the same angle with the rear axle as in its original position, a bearing in said bracket for the transmission shaft, an extension shaft connecting the motor drive shaft and said transmission shaft, including a universal joint interposed at one of the connecting ends of said extension shaft.

4. The combination, with the transmission and drive shafts of a motor vehicle, of mechanism adapted to change the wheel base from a small car to a large truck, comprising means to space the rear wheels, axle and transmission shaft operatively connected therewith, from their original position, a cross bracket to support the transmission shaft in substantially the same angle with the rear axle as in its original position, said bracket having an opening to receive a dished member therein, an extension shaft connected to the motor drive shaft and in alinement therewith, extending to said bracket, an inclosing tube for said extension shaft carrying a dished member adapted to fit within said bracket opening, and a bearing for said extension shaft adjacent said bracket.

5. The combination with the transmission and the drive shafts of a motor-vehicle; of an extension shaft interposed between said shafts, to the respective ends of which extension shaft the transmission and the drive shafts are flexibly connected, a tube inclosing the extension shaft and having a globular enlargement at one end in which is housed the flexible connection between said shaft and the transmission shaft, means for fastening said end of the tube to the transmission case, a transverse hanger carried by the frame of the vehicle and having an opening, and a dished member secured in said opening and having a tubular extension seating in the rear end of the tube, said extension also having a bearing for the extension shaft.

6. The combination with the transmission and the drive shafts of a motor vehicle; of an extension shaft interposed between said shafts, to the respective ends of which extension shaft the transmision and the drive shafts are flexibly connected, a tube inclosing the extension shaft and having a globular enlargement at one end in which is housed the flexible connection between said shaft and the transmission shaft, means for fastening said end of the tube to the transmission case, a transverse hanger carried by the frame of the vehicle and having an opening, a dished member secured in said opening and having a tubular extension seating in the rear end of the tube, said extension also having a bearing for the extension shaft, and a tubular housing inclosing the drive shaft and having a housing part operating in conjunction with the aforesaid dished member to inclose the flexible connection between the drive shaft and the extension shaft.

In testimony whereof I have signed my name hereto in the presence of two witnesses.

GUY S. DAVISON.

Witnesses:

WM. A. KIMBALL,

C. V. AYERS.